United States Patent [19]
Nelson

[11] Patent Number: 5,123,247
[45] Date of Patent: Jun. 23, 1992

[54] SOLAR ROOF COLLECTOR

[75] Inventor: Richard Nelson, Ste-Anne-de-Bellevue, Canada

[73] Assignee: 116736 (Canada) Inc., Canada

[21] Appl. No.: 479,569

[22] Filed: Feb. 14, 1990

[51] Int. Cl.⁵ .............................. F03G 6/00; F24J 2/04
[52] U.S. Cl. ................................ 60/641.8; 60/641.15;
126/437; 126/438; 126/425
[58] Field of Search .............. 126/424, 425, 428, 429,
126/430, 438, 448, 451, 235.1; 237/13;
60/641.8, 641.9, 641.11, 641.12, 641.13, 641.14,
641.15; 290/1 R, 2

[56] References Cited

U.S. PATENT DOCUMENTS

| | | |
|---|---|---|
| 4,117,831 | 10/1978 | Bansal et al. |
| 4,209,222 | 6/1980 | Posnansky |
| 4,238,247 | 12/1980 | Oster, Jr. |
| 4,279,244 | 7/1981 | McAlister |
| 4,299,201 | 11/1981 | Tsubota |
| 4,377,154 | 3/1983 | Meckler ........................ 126/425 |
| 4,408,596 | 10/1983 | Worf |
| 4,469,938 | 9/1984 | Cohen ........................ 126/425 X |
| 4,549,078 | 10/1985 | Monahan ........................ 126/425 |
| 4,794,245 | 12/1988 | Auer ........................ 126/425 X |

FOREIGN PATENT DOCUMENTS

| | | |
|---|---|---|
| 3001023 | 7/1981 | Fed. Rep. of Germany . |
| 2501840 | 9/1982 | France . |
| 2028149 | 3/1980 | United Kingdom . |

Primary Examiner—Henry A. Bennet
Attorney, Agent, or Firm—Lowe, Price, LeBlanc & Becker

[57] ABSTRACT

A solar roof collector comprising a plate collector with a plurality of transparent conduits to channel a thin film of water from an insulated reservoir in order to increase the temperature of water therein as a result of heat absorption in the plate collector. An evaporative chiller including transparent air ducts in which air is circulated receives in the air ducts pre-heated water from the insulated reservoir, distributed therein preferably under the form of a thin film. Some water in the air ducts is vaporized and the vapor saturated air is passed through a vortex condensor, precipitating water which generates thermal energy. The thermal energy may be used to drive a gas turbine or another type of energy conversion device.

25 Claims, 3 Drawing Sheets

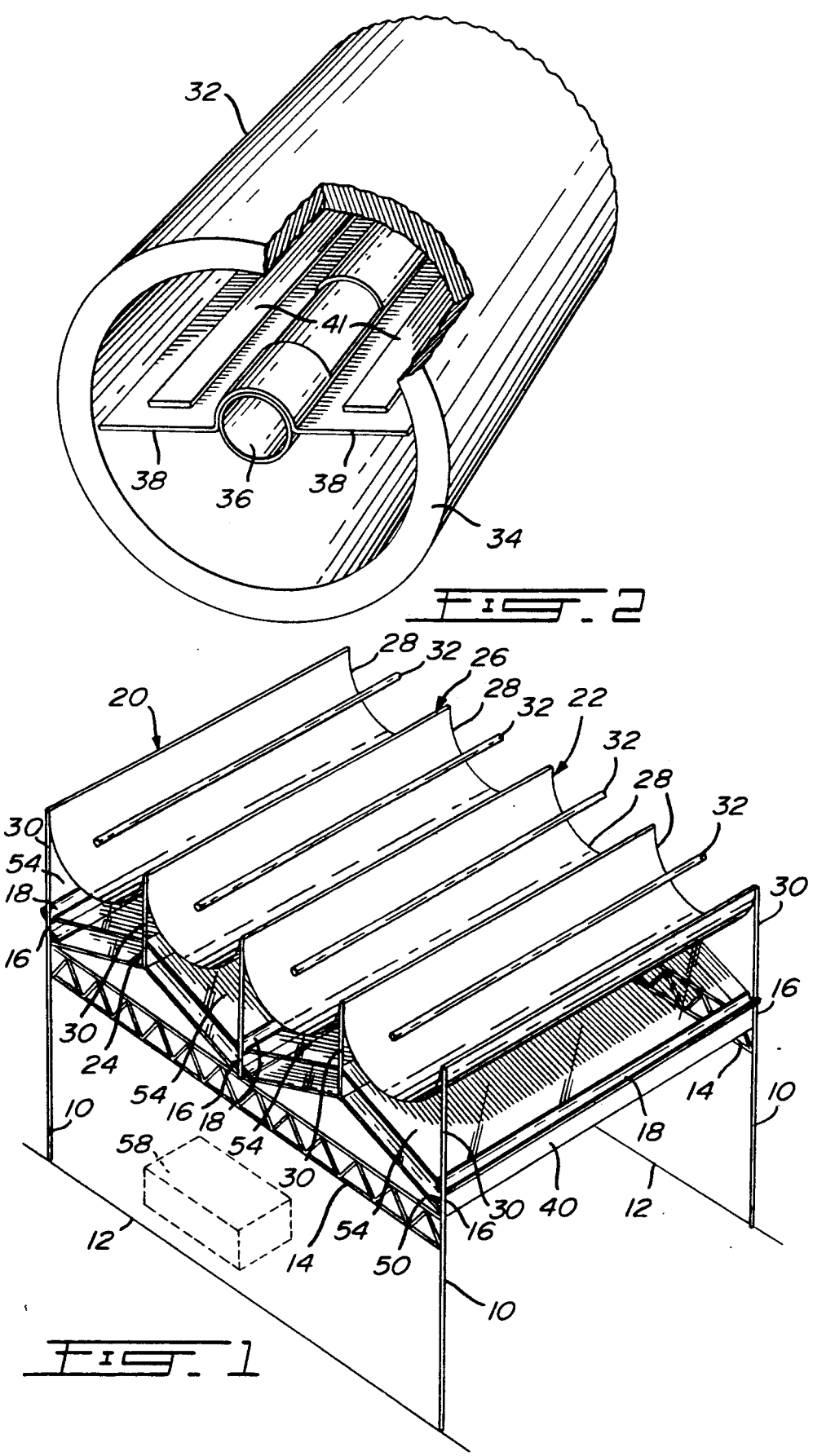

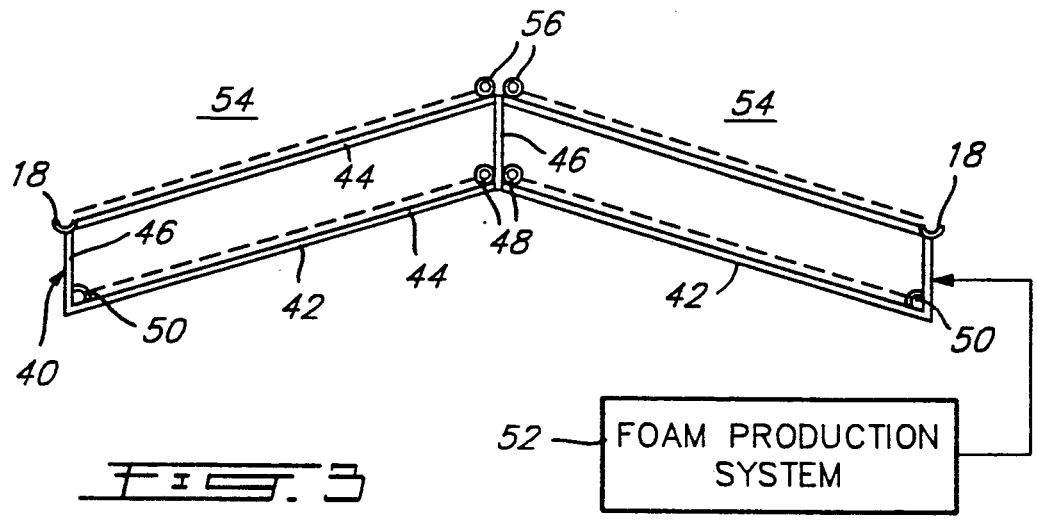
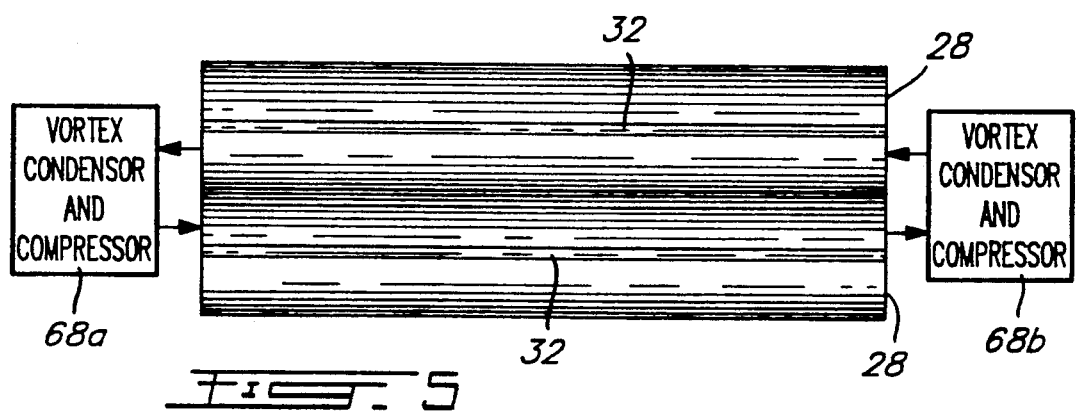
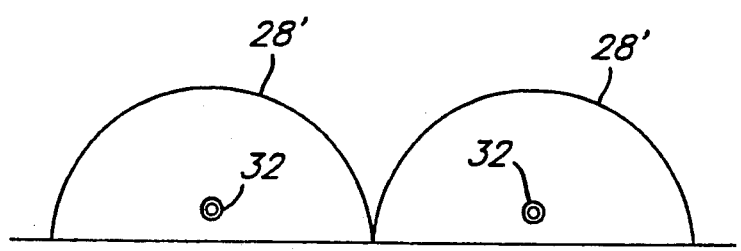

SOLAR ROOF COLLECTOR

FIELD OF THE INVENTION

The present invention relates to the general field of energy production and, more particularly, to a solar roof collector for converting solar energy into mechanical energy. The invention also extends to a solar collector for use in a solar roof construction.

BACKGROUND OF THE INVENTION

Solar energy is considered by many to be an attractive alternative to conventional energy generating techniques which utilize fossil or nuclear fuels. Solar energy is abundant, environmentally safe, renewable and freely available everywhere. For these reasons, considerable efforts and ressources have been devoted by the past to the development of highly efficient systems to convert solar energy into electrical, thermal or mechanical energy that is more convenient to use.

Generally speaking, solar conversion systems may be classified in two general categories. Systems that belong to the first category utilize some type of heat collector, exposed to the radiation from the sun and channeling a working fluid which absorbs heat and may then be used to drive a turbine/electrical generator group. In order to enhance the heat collection, the sun radiation may be focused on the working fluid channel by means of reflecting or refracting devices. Systems of this type may reach a relatively high degree of efficiency, however they require some type of expensive and complex tracking device to maintain the optical focussing system at an optimal angle with respect to the sun.

The second category of solar convertors includes various types of photocell devices which convert directly the sun radiation into electric power. These systems do not have the required efficiency for a wide spread commerical use and their applications are yet very limited.

OBJECTS AND STATEMENT OF THE INVENTION

An object of the present invention is a solar roof collector for use on a building structure, having higher efficiency than conventional solar roof conversion devices.

Another object of the invention is a solar roof collector with good light transmissive characteristics to allow sunlight to enter the building.

Another object of the invention is a solar heat collector with provisions to generate directly electrical power.

A further object of the invention is an improved solar focusing collector for use with a solar roof system, having selective light reflecting or refracting characteristics.

In one aspect, the invention provides a solar roof, system including a two-satge collector which allows to convert a working fluid having a temperature which is not sufficiently high to operate a conventional energy conversion device, such as a gas turbine or a piston device, into a higher temperature working fluid that can directly drive a conventional energy conversion system. The two-stage collector is transparent or translucent to visible light to allow the visible light to penetrate within the building structure on which the solar roof system is mounted. The first stage comprises a plate collector partly based on the concept of a solar collector described in applicant's Canadian patent number 1,150,586 issued on Jul. 26, 1983, including a light transmissive conduit in which is flowed a working fluid, such as water, to cool the conduit and also to absorb heat from the sun radiation passing through the conduit.

The second stage receives the working fluid warmed at the first stage and through an evaporation-condensation process, generates a hotter working fluid which can be used to drive an energy conversion device to produce mechanical energy. More particulary, the second stage includes an evaporative chiller comprising a light transmissive ducting and an air moving device, such as a blower, coupled to the ducting in order to create an air flow therein. Pre-heated working fluid from the first stage is flowed in the ducting, preferably under the form of a thin film flow. The air circulation in the ducting causes rapid vaporization of a certain quantity of working fluid, thereby extracting heat from the working fluid which is equal to the latent heat of vaporization. The return working fluid is therefore colder than the inlet working fluid. The vapor containing air passes through a condensation device, such as a vortex precipitator that produces a significant quantity of working fluid and heat, as a result of the condensation. The heat may be supplied to an energy conversion device to generate mechanical power.

It will be appreciated that a certain energy input is provided to the working fluid at the second stage of the collector as a result of the flow of working fluid through a light transmissive ducting exposed to sunlight.

Preferably, the solar roof system further includes a high grade heat collection system which is generally transparent to light in the visible and in the infra-red range of the spectrum, positioned above the two-stage collectror. The high grade collector includes a focusing system to direct non-visible short wave radiation, such as ultra-violet rays toward one or more conduits that channel a working fluid. As a result of the heat transfer, the working fluid is super-heated and may be used to drive an energy conversion device.

Preferably, the solar roof system also includes a thermal mass that can be used to store low grade heat from the plate collector, that can be supplied when needed to the evaporative chiller. In its simplest form, the thermal mass may be a reservoir for the working fluid, having good insulation characteristics. Advantageously, reject heat from the turbine operated by the evaporative chiller collector may be dissipated in this thermal mass to reduce energy losses of the system.

The high grade and the two-stage collectors may be used to supply power, such as electricity, to the various power operated components of the system, such as pumps, blowers, etc. When the power input exceeds the power output of the system, the energy excedent may be store in batteries, mechanical devices, etc. or supplied to the utility grid.

The solar roof collector, according to the invention, is expected to have a relatively high efficiency which can contribute to significantly reduce the heating and cooling costs of the building on which the solar roof collector is installed. During the winter and the summer, the high grade collector provides electrical energy to assist in heating or cooling the building, therefore reducing the required energy input to the heating and to the cooling systems. During the summer, the two-stage collector will cool the roof structure by absoring heat, to produce in turn, useable energy in addition to reducing the thermal load to the cooling system of the building by preventing heat to enter the building. The light transmissivity is another desirable feature of the solar roof system, allowing to reduce lighting costs.

In a preferred embodiment, the solar roof collector is supplemented with a replaceable foam insulation system of the type described in applicant's Canadian patent 1,179,821 issued on Dec. 27, 1984.

In another aspect, the invention provides a solar forcussing collector including a conduit channeling a working fluid, and a focussing structure to direct relatively short wavelength radiation, such as ultraviolet radiation toward the conduit for heating the working fluid therein. The focussing structure is substantially transparent to radiation in the visible range of the spectrum, whereby the focussing structure may be used in the construction of a solar roof collector without preventing sunlight to enter the building.

In a preferred embodiment, the focussing structure comprises a thin reflective film arranged to create a plurality of parallel reflective cavities. In each cavity is mounted a vacuum tube collector that channels a working fluid. The thin film may either be supported on a rigid structure or only suspended at spaced apart locations, its final shape being obtained as a result of an air pressure differential created on either side of the film.

In a variant, a refraction technique may be used to focus the ultra-violet light toward the conduit channeling working fluid. Recently developed micro-embossing techniques of films may be used to construct a refractive film. Other types of lenses may be used as well in order to concentrate the ultra-violet rays toward the conduit which channels the working fluid.

In another aspect, the invention provides a hybrid solar collector, preferably used in combination with a solar radiation focussing device, to produce heated working fluid and electrical power. The hybrid solar collector includes an evacuated light transmissive envelope in which is mounted a conduit to channel heat absorbing working fluid that may be supplied to an appropriate energy conversion device to produce mechanical energy, when it has been sufficiently heated by solar radiation concentrated on the conduit. One or more photocells are mounted in the envelope and thermally coupled to the conduit. The cells generate directly electrical power. It will be appreciated that the heat absorbing working fluid fulfills a dual role. Firstly, it collects heat which can then be transformed into some other type of energy. Secondly, it cools the photocells and prevents them to overheat.

In summary, the invention relates to a solar focussing collector, comprising:
a conduit to channel a heat absorbing working fluid;
ultra-violet focussing means coupled to the conduit for directing solar ultra-violet radiation toward the conduit, the focussing means being substantially transparent to visible and infra-red solar radiation.

The invention also extends to a solar roof collector, comprising:
a high grade collector, including:
  a) a conduit to channel a heat absorbing working fluid;
  b) an ultra-violet focussing means coupled to the conduit for directing ultra-violet radiation toward the conduit, the focussing means being substantially transparent to infra-red and visible radiation;
  c) a first energy converter means in a fluid communication with the conduit to produce mechanical energy as a result of flow of heated working fluid therethrough;
a low grade collector, comprising:
  a) an insulated reservoir for storing a light transmissive working fluid;
  b) a plate collector, including:
    i) a conduit means mounted under the high grade collector, the conduit means transmitting visible radiation;
    ii) means to flow working fluid from the insulated reservoir through the conduit means and back to the insulated reservoir to increase the temperature of working fluid in the insulated reservoir as a result of heat absorption by working fluid flowing in the conduit means;
  c) an evaporative chiller, including:
    i) an air duct transmitting visible radiation;
    ii) means to create an air flow through the air duct;
    iii) means to flow working fluid from the insulated reservoir through the air duct and back to the insulated reservoir to cause vaporization of working fluid in the air duct;
    iiii) condensing means in fluid communication with the air duct for receiving vapour containing air, said condensing means precipitating working fluid to produce heat;
  d) a second energy converter means thermally coupled to the condensing means for producing mechanical energy as a result of thermal energy received from the condensing means.

The invention also comprehends a solar roof collector, comprising;
an insulated reservoir for storing a light transmissive working fluid;
a plate collector including a conduit means transmitting visible radiation;
means to flow working fluid from the insulated reservoir through the conduit means and back to the insulated reservoir to increase the temperature of working fluid therein as a result of heat absorption by working fluid flowing in the conduit means;
an air duct adjacent the conduit means, the air duct transmitting visible radiation;
means to create an air flow through the air duct;
means to flow working fluid from the insulated reservoir through the air duct and back to the insulated reservoir to cause vaporization of working fluid in the air duct;
condensing means in fluid communication with the air duct for receiving vapour containing air, the condensing means precipitating working fluid to produce heat; and
an energy converter means thermally coupled to the condensing means for producing mechanical energy from heat received from the condensing means.

Furthermore, the invention also comprises a hybrid solar collector, comprising:
an evacuated light transmissive envelope;
a conduit mounted in the envelope to channel heat absorbing working fluid;
a photocell mounted in the envelope and thermally coupled to the conduit.

BRIEF DESCRIPTION OF THE DRAWINGS

FIG. 1 is a perspective view of a solar roof collector, according to the present invention, some elements being omitted for clarity;

FIG. 2 is a detailed isometric view illustrating one embodiment of a vacuum tube for locating at the focal location of a high grade solar collector, according to the invention;

FIG. 3 is a front elevational view of a canopy system module for use with the solar roof collector, according to the invention;

FIG. 5 is a schematic view illustrating the air flow path in the evaporator chiller of the solar roof system depicted in FIG. 4; and FIG. 6 is a cross-sectional front elevation through a high-grade collector according to a variant.

DESCRIPTION OF PREFERRED EMBODIMENTS

Figure 4:
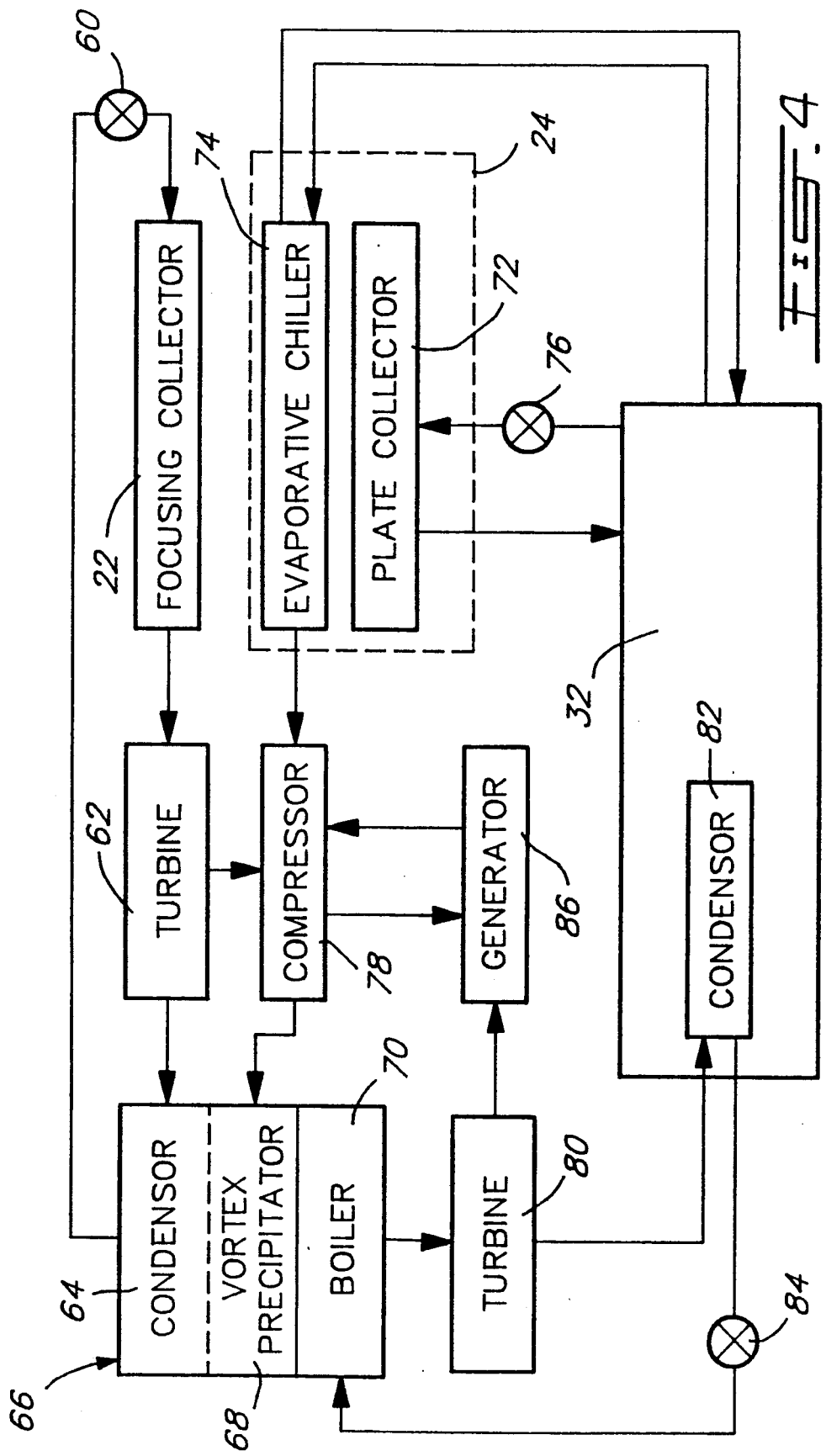
FIG. 4 is a block diagram illustrating the operation of the solar roof system according to the invention.

Referring now to the drawings, FIG. 1 illustrates a building structure having colums 10 extending from foundations 12 and supporting roof grid beams 14. Beam sections 16 extend upwardly from the grid beams 14 and run for the length of the building. On the top of each beam section 16 is a gutter 18.

A solar roof system 20 is supported on the beam sections 16. The solar roof system 20 may be adapted to roof supporting structures other than the one shown in FIG. 1. The solar roof system 20 includes a solar high grade collector 22, which is a focussing collector located above a low grade collector 24.

The high grade collector 22 comprises a reflector assembly 26 utilizing a plurality of generally parallel reflectors 28 which are supported on the beam sections 16 by appropriate support structures 30. The reflectors 28 are made of a relatively light thin film, therefore massive supporting structure are not required. The reflectors 28 focus ultra-violet rays from the sun on a focal location where vacumm tube collectors 32 are positioned and allow visible and infra-red radiation to pass therethrough. It is preferred that the curved surface of the reflectors 28 be on a north to south axis so that as the sun swings from east to west, it is relatively perpendicular to the optical axis of the curved surface of the reflectors 28 during peak midday insolation periods.

Referring to FIG. 2, a vacuum tube collector 32 comprises a clear outside tube 34 having a vacuum therein. It has a black radiation absorbing center tube 36 to channel working fluids therethrough and flanges 38 extending at both sides to assist in collecting heat to transmit to the center tube 36 and also to position the tube 36 in the approximate center of the outside tube 34. Photocells 41 are mounted on the flanges 38 on each side of the center tube 36 thus the radiant energy from the sun is absorbed not only by the liquid or vapour passing in the center tube 36, but also transformed into electric energy by the photocells 41. It will also be appreciated that working fluid cools the photocells 41 and prevent them to overheat.

In a variant not shown in the drawings, the outside tube 34 may be provided with a rotatable shield having a reflective surface on its exterior. This reflective shield can be rotated to block radiation from reaching the collector should the flow of working fluid be cut off, and therefore to cause the vacuum tube collector to overheat. In another variant, the vacuum tube collector 32 may be made moveable so that it can be placed out of the focal location thus, it is not heated in the same way as when the rays of the sun are focused directly on it.

Referring now to FIGS. 1 and 3, beneath the high grade solar collector 22 is a canopy system 40 which forms part of the low grade collector 24. The canopy system 40 comprises adjacent hollow sleeves 42 arranged in a zig zag fashion. FIG. 3 shows a module formed by a pair of adjacent sleeves 42. Each sleeve 42 is constituted by a pair of slanted top and bottom transparent membranes 44 and lateral walls 46. Within each sleeve 42 is provided a longitudinally extending working fluid distribution conduit 48, mounted at the high end of the sleeve 42. The conduit 48 creates a thin film of working fluid, such as water, flowing on the lower membrane 44 and being collected in a gutter 50 at the low end of the sleeve 42. This type of canopy system is described in the earlier referenced Canadian patent 1,150,586. If desired, the canopy system may be equipped with a foam generator 52 of the type described in the earlier referenced Canadian patent 1,179,821, to fill the hollow sleeves 42 with removeable foam to insulate the canopy system 40 temporarily, such as during the night.

Between the canopy system 40 and the reflectors 28 are created parallel air ducts 54 which form part of a low pressure evaporative chiller, a component of the low grade collector 24. The evaporative chiller, whose structure will be described in more details later, includes working fluid distribution conduits 56 which create a thin film of working fluid, such as water, flowing on the top membranes 44 of the canopy system 40 and is collected in the gutters 18. The air flow in the ducts 54 creates a negative pressure in thee ducts resulting in a pressure differential on either side of the thin film reflectors 20 and may be used to give the reflectors their final shape. With this arrangement, the thin reflective film needs to be supported only on a few points above the canopy system 40.

Beneath the floor of the building which supports the roof system 20 is a thermal mass under the form of an insulated water reservoir 58. For example, the reservoir 58 may include a water-proof lining surrounding a gravel or a water flooded rock bed. The thermal mass 58 is preferably within the footing system of the building . In one embodiment, the thermal mass may extend beyond the building or in another embodiment, it may consist of a deep ground well. The thermal mass 58 provides storage of heat so that heat produced during the day can be utilized at night and at colder periods. In addition, the thermal mass 58 may be partitioned to contain quantities of working fluid at different temperatures.

The operation and structure of a solar energy roof system, according to the invention, and utilizing the construction shown in FIG. 1, is depicted in FIG. 4. The high grade collector 22 receives working fluid such as water from a pump 60, whereby the water flows through the vacuum tube collectors 32, heats the water up to temperatures of 200° C. or more, where the liquid vaporizes and the vapour is used to drive a gas turbine 62 of known construction before returning to a condensor 64 which is part of a heat exchanger 66 containing a vortex precipitator system 68 and a boiler 70. In the condensor 64, the vapour condensates to a liquid which is then pumped again through the vacuum tube collectors 32.

The low grade collector 24 may be divided in two main components, namely a plate collector 72 and an evaporative chiller 74. The plate collector 72 comprises the canopy system 40, which receives water from the thermal mass 58, elevated to the conduits 48 of the canopy system 40 by a pump 76 and channeled back to the thermal mass 58 through the gutters 50. The circulation of water through the plate collector 72 causes the water to warm, whereby the section of the thermal mass which supplies water will see its temperature gradually increase.

The evaporative chiller 74 includes an air moving device such as a blower or compressor 78 which causes a forced convection of air in the duct-like cavities 54 in cross-current to a water flow provided over the top of the canopy system 58 from the thermal mass 58. This water flow consists of a thin film flow from the peak of the canopy system from the conduits 56 and it is returned to the thermal mass 58 from the gutters 18. The flow of air to the chiller device causes the rapid vaporization of some of this water, thereby extracting heat from the chiller water flow equal to the latent heat of vaporization. The return water is therefore colder and is returned to the section of the thermal mass 58 which is being currently chilled. This section of the thermal mass will become relatively cold. When its temperature is depressed to a certain limit, say 50° F., the chiller water supply will be switched to a warmer section of the thermal mass. The heat in these warmer sections is the result of solar thermal heat acquired and stored when these sections have previously been used as a heat storage for the plate collector 72.

FIG. 5 illustrates schematically the arrangement of the ducts 54 and the vortex precipitator sysetm 68. The vapour saturated air stream moves through the compressor 78 into a first vortex condensor 68a, of a type known in the art, where a sudden pressure drop occurs. The pressure drop together with a reversing flow vortex action causes the water vapour to precipitate and to separate from the air stream. The air stream enters the adjoining chiller duct and as it is now dry it is used as a supply of air into this adjoining chiller duct. This dry air then converts in the reverse direction back along the length of the roof system to become saturated once more before entering a similar air mover vortex precipitator 68b at the opposite end of the roof. Thus, the air stream enters again the first mentioned chiller duct. It is preferred to combine each vortex condensor with a compressor 78 into a single unit, as shown schematically in FIG. 5.

Referring back to FIG. 4, the vortex precipitator system 68 generates a significant quantity of water and heat, being the heat of condensation. The precipitate is cooled and returned to the thermal mass 58. The heat is delivered to the heat exchanger 66 thermally coupled to the boiler 70 of an efficient closed cycle gas turbine power generator system. The boiler 70 for the gas turbine 80 extracts heat from the vortex precipitator system 68 and the condensor 64, and the condensor element 82 of this closed cycle gas turbine power generator system delivers the rejection heat to the thermal mass 58. A pump 84 is used to circulate the working fluid from the condenser 82 to the boiler 70.

The configuration of this system is very efficient because it is "regenerative" that is to say the rejected condenser heat is recovered in the thermal mass 58 and can be extracted again by the chiller device 74.

The turbine 62 is mechanically coupled to the compressor 78 which in turn drives, through a mechanical connection, an electrical generator 86. The turbine 80 is also mechanically coupled in a driving relationship to the generator 86. It may also be envisaged to couple both turbines solely to the generator 86 which will drive the compressor 78 by the intermediary of an electric motor.

The power output of generator 86, driven by the turbine 62 and/or turbine 80, less the energy consumed to drive the compressor 78 is used to charge a battery storage (or any other suitable form of electrical energy storage). Any non-electric storage system providing fast charging and efficient reconversion and durable charge//discharge capabilities can also be employed. If the output is not stored it may be consumed directly and/or sold into the utility grid.

A variant of the high-grade collector is shown in FIG. 6. The collector uses refractive cavities 28' instead of reflectors. The cavities 28' of the high grade collector may be made of glass, fabric, silicone, plastic or a laminated composition which is transparent, thus admitting light and infra-red rays therethrough. The optical system for focussing the ultra-violet light from the sun regardless of its position in the sky is provided within the sheet of the refractor. The focusing is done by a thin optical element using total internal refraction so that at least part of the direct beam radiation energy from the sun, regardless of where it is in the sky, is focused on the vacuum tube 32.

The refractors 20' may be built by embossing on the suitable thin sheet to support a micro-prismatic or holographic structure to obtain the desired refraction characteristics. The details of the manufacturing of the refractors are not deemed to be necessary here since micro-prismatic embossing is known in the art and it does not form part of this invention.

I claim:
1. A solar roof collector comprising:
   a high grade collector, including,
   a) a conduit to channel a heat absorbing working fluid;
   b) an ultra-violet focussing means coupled to said conduit for directing ultra-violet radiation toward said conduit, said focussing means being substantially transparent to infra-red and visible radiation;
   c) a first energy converter means in a fluid communication with said conduit to produce mechanical energy as a result of flow of heated working fluid therethrough;
   a low grade collector, comprising:
   a) an insulated reservoir for storing a light transmissive working fluid;
   b) a plate collector, including:
      i) a conduit means mounted under said high grade collector, said conduit means transmitting visible radiation;
      ii) means to flow working fluid from said insulated reservoir through said conduit means and back to said insulated reservoir to increase the temperature of working fluid in said insulated reservoir as a result of heat absorption by working fluid flowing in said conduit means;
   c) an evaporative chiller, including;
      i) an air duct transmitting visible radiation;

ii) means to create an air flow through said air duct;

iii) means to flow working fluid from said insulated reservoir through said air duct and back to said insulated reservoir to cause vaporization of working fluid in said air duct;

iiii) condensing means in fluid communication with said air duct for receiving vapour containing air, said condensing means precipitating working fluid to produce heat;

d) as second energy converter means thermally coupled to said condensing means for producing mechanical energy as a result of thermal energy received from said condensing means.

2. A solar roof collector as defined in claim 1, wherein said ultra-violet focussing means is a reflector.

3. A solar roof collector as defined in claim 2, wherein said reflector comprises a thin reflective film.

4. A solar roof collector as defined in claim 1, wherein said ultra-violet focussing means is a refracting structure directing ultra-violet radiation toward a focal location, said conduit being positioned at said focal location.

5. A solar roof collector as defined in claim 1, wherein said conduit is mounted in a substantially transparent evacuated envelope.

6. A solar roof collector as defined in claim 5, wherein said conduit has a black radiation absorbing coating.

7. A solar roof collector as defined in claim 1, wherein said high grade collector includes a gas turbine in a fluid path with said conduit, downstream of said conduit.

8. A solar roof collector as defined in claim 7, wherein said high grade collector includes a condensor in a fluid path with said gas turbine, downstream of said gas turbine.

9. A solar roof collector as defined in claim 8, wherein said high grade collector includes a pump in a fluid path containing said conduit, said gas turbine and said condensor.

10. A solar roof collector as defined in claim 7, wherein said gas turbine is in a driving relationship with said means to create an air flow through said air duct.

11. A solar roof collector as defined in claim 1, wherein said condensing means is a vortex precipitator.

12. A solar roof collector as defined in claim 1, wherein said second energy converter means includes a closed loop fluid path comprising a boiler thermally coupled to said condensing means, and a gas turbine downstream of said boiler.

13. A solar roof collector as defined in claim 12, wherein said boiler is thermally coupled to said condensor.

14. A solar roof collector as defined in claim 12, wherein said closed loop fluid path includes a pump.

15. A solar roof collector as defined in claim 12, wherein said closed loop fluid path is thermally coupled to said insulated reservoir to transfer heat thereto.

16. A solar roof collector as defined in claim 1, further comprising an electrical generator coupled to an energy converter means.

17. A solar roof collector as defined in claim 1, further comprising an electrical generator coupled to said first and second energy converter means.

18. A solar roof collector as defined in claim 1, wherein said air duct is located between said ultra-violet focussing means and said conduit means.

19. A solar roof collector as defined in claim 1, comprising a plurality of elongated ultra-violet reflectors extending generally parallel to one another and defining respective reflective cavities; a pair of vertically spaced apart membranes extending under said reflective cavities, and working fluid distribution means between said membranes.

20. A solar roof collector as defined in claim 19, comprising a plurality of air ducts between said membranes and said reflective cavities.

21. A solar roof collector as defined in claim 1, comprising:
a plurality of elongated ultra-violet focussing means arranged side-by-side;
a conduit associated with each of said ultra-violet focussing means to channel heat absorbing working fluid;
a plurality of hollow sleeves arranged side-by-side under said plurality of elongated ultra-violet focussing means, each of said hollow sleeves transmitting visible light and comprising top and bottom slanted and vertically spaced apart walls, the respective top and bottom walls of adjacent hollow sleeves being oriented at an angle relatively to one another;
working fluid distribution means to flow working fluid in each hollow sleeve;
said evaporative chiller including a plurality of air ducts defined between said hollow sleeves and said plurality of elongated ultra-violet focussing means.

22. A solar collector, comprising:
an insulated reservoir for storing a light transmissive working fluid;
a plate collector including a conduit means transmitting visible radiation;
means to flow working fluid from said insulated reservoir through said conduit means and back to said insulated reservoir to increase the temperature of working fluid therein as a result of heat absorption by working fluid flowing in said conduit means;
an air duct adjacent said conduit means, said air duct transmitting visible radiation;
means to create an air flow through said air duct;
means to flow working fluid from said insulated reservoir through said air duct and back to said insulated reservoir to cause vaporization of working fluid in said air duct;
condensing means to fluid communication with said air duct for receiving vapour containing air, said condensing means precipitating working fluid to produce heat; and
an energy converter means thermally coupled to said condensing means for producing mechanical energy from heat received from said condensing means.

23. A solar collector as defined in claim 22, wherein said condensing means is a vortex precipitator.

24. A solar collector, as defined in claim 22, wherein said energy converter means is in a driving relationship with said means to create an air flow through said air duct.

25. A solar collector as defined in claim 22, wherein said conduit means includes a plurality of hollow sleeves arranged side-by-side, each hollow sleeve having top and bottom slanted walls which transmit visible light.

* * * * *